(12) United States Patent
Thomas et al.

(10) Patent No.: US 10,176,087 B1
(45) Date of Patent: Jan. 8, 2019

(54) AUTOGENIC TEST FRAMEWORK

(71) Applicant: INTUIT INC., Mountain View, CA (US)

(72) Inventors: Vijay Thomas, Mountain View, CA (US); Amit Ksirsagar, Mountain View, CA (US); Swathi Singireddy, Santa Clara, CA (US); Sharath Nagaraj Dwaral, Mountain View, CA (US); Hadik Parekh, Mountain View, CA (US); Sumeet Chandra, Mountain View, CA (US); Jiajie Duan, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 15/693,031

(22) Filed: Aug. 31, 2017

(51) Int. Cl.
*G06F 9/44* (2018.01)
*G06F 11/36* (2006.01)

(52) U.S. Cl.
CPC ...... *G06F 11/3684* (2013.01); *G06F 11/3688* (2013.01); *G06F 11/3692* (2013.01)

(58) Field of Classification Search
USPC .................................. 717/127, 128, 131
See application file for complete search history.

*Primary Examiner* — Chuck O Kendall
(74) *Attorney, Agent, or Firm* — Patterson + Sheridan LLP

(57) ABSTRACT

The present disclosure relates to autogenic software testing. In some embodiments, a method of the present disclosure includes scanning source code to identify one or more methods to be tested. The method further includes generating one or more test cases which perform requests using the one or more methods. The method further includes generating one or more logs comprising results of the requests. The method further includes scanning the one or more logs to identify a pattern associated with a request. The method further includes determining that the pattern is not stored in a test data store. The method further includes generating a first test and a first expected response based on the pattern. The method further includes storing the first test and the first expected response in the test data store. The first test may be executed and evaluated based on the first expected response.

21 Claims, 6 Drawing Sheets

AUTOGENIC TEST FRAMEWORK

FIELD

Embodiments presented herein generally relate to automated software testing, and more specifically to autogenic test case repositories which grow without human intervention.

DESCRIPTION OF THE RELATED ART

Software testing frequently involves the use of automated unit tests and functional tests which exercise aspects of the software and check for an acceptable outcome. During the software development lifecycle, code may be changed to add or remove functionality to the program. To ensure that code changes made to a project do not break the functionality of stable code that has been previously tested, a developer may write unit tests and function tests to test the code. Unit tests generally test a particular method within the code, while function tests generally test a particular line of software functionality (e.g., a use case). These tests generally provide input into a function or set of functions and allow a user to verify that the function or set of functions provides an expected output value. For example, a developer can use source code constructs, such as an assertion, to compare the actual output of a function with the expected output of the function. If the assertion passes, the program continues executing. Otherwise, the developer is notified that the function under test does not provide the expected functionality (e.g., generates output that is different from the expected output). The developer can subsequently use the information from the unit test to revise the software project until the function under test passes the test.

Unit and function testing generally requires that a developer write tests to provide input into a function or functions to be tested and compare the output of the function or functions to an expected output. As the code base grows, it may be difficult to ensure that test cases are written which provide comprehensive coverage of the code. For example, it may be time-consuming for developers to anticipate and keep track of corner cases. Furthermore, once the software is in use, it is difficult to keep track of new problems as they are discovered and ensure that test cases are written which check that these problems do not reoccur once they are resolved.

SUMMARY

One embodiment of the present disclosure includes a method for autogenic software testing. The method generally includes scanning source code to identify one or more methods to be tested. In some embodiments, the method further includes generating one or more test cases which perform requests using the one or more methods. In certain embodiments, the method further includes generating one or more logs comprising results of the requests. In some embodiments, the method further includes scanning the one or more logs to identify a pattern associated with a request. In certain embodiments, the method further includes determining that the pattern is not stored in a test data store. In some embodiments, the method further includes generating a first test and a first expected response based on the pattern. In certain embodiments, the method further includes storing the first test and the first expected response in the test data store, wherein the first test is executed and evaluated based on the first expected response.

Another embodiment provides a computer-readable storage medium having instructions, which, when executed on a processor, performs a method for autogenic software testing. The method generally includes scanning source code to identify one or more methods to be tested. In some embodiments, the method further includes generating one or more test cases which perform requests using the one or more methods. In certain embodiments, the method further includes generating one or more logs comprising results of the requests. In some embodiments, the method further includes scanning the one or more logs to identify a pattern associated with a request. In certain embodiments, the method further includes determining that the pattern is not stored in a test data store. In some embodiments, the method further includes generating a first test and a first expected response based on the pattern. In certain embodiments, the method further includes storing the first test and the first expected response in the test data store, wherein the first test is executed and evaluated based on the first expected response.

Still another embodiment of the present invention includes a processor and a memory storing a program, which, when executed on the processor, performs a method for autogenic software testing. The method generally includes scanning source code to identify one or more methods to be tested. In some embodiments, the method further includes generating one or more test cases which perform requests using the one or more methods. In certain embodiments, the method further includes generating one or more logs comprising results of the requests. In some embodiments, the method further includes scanning the one or more logs to identify a pattern associated with a request. In certain embodiments, the method further includes determining that the pattern is not stored in a test data store. In some embodiments, the method further includes generating a first test and a first expected response based on the pattern. In certain embodiments, the method further includes storing the first test and the first expected response in the test data store, wherein the first test is executed and evaluated based on the first expected response.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

DETAILED DESCRIPTION

Automated software testing generally involves test cases which are written by a developer, and which are automatically executed to ensure that changes to the source code do not cause existing functionality to break. The output of a method under test is compared to an expected output. If the output of the method matches the expected output, the test passed. Otherwise, if the test fails, the developer can revise the code until the method under test provides the expected results. Manually generating tests is a time-intensive process that requires developers to evaluate a potentially vast amount of source code and determine countless input parameters in order to write substantial amounts of code for use in testing. Furthermore, it can be difficult to identify, track, and continually test problems which arise during use of the software.

Embodiments presented herein provide techniques for providing autogenic software testing. For example, an autogenic testing engine scan source code of an application in order to automatically identify classes to be comprehensively tested. The autogenic testing engine may generate test requests which exercise the classes identified by the class scanner (e.g., requests to an application programming interface (API) of the application). The results of executing the test requests (e.g., the responses) are logged, along with the results of executing test requests received from a test user interface (e.g., developers may manually submit test requests), are logged. The autogenic testing engine may scan the logs generated by executing test requests in order to identify patterns which are not yet covered by automated tests. For example, a pattern may comprise a number of characters in a credit card region. The autogenic testing engine may search a test data store to determine if this pattern is currently covered by any automated tests, and, if not, add the request and response associated with the pattern as a new test request and expected response.

Furthermore, the autogenic testing engine may scan logs to identify exceptions which occurred during execution. If it finds an exception, the autogenic testing engine may generate an entry in a defect tracking tool and create a test case based on the exception. When the autogenic testing engine determines that the entry in the defect tracking tool has been closed (e.g., indicating that a developer has resolved the problem), it will execute the test and determine if it executes without error. If the test executes without error, the response will be saved as the expected response for the test. If the test fails, the autogenic testing engine may reopen the entry in the defect tracking tool so that the problem may be addressed.

Figure 1:
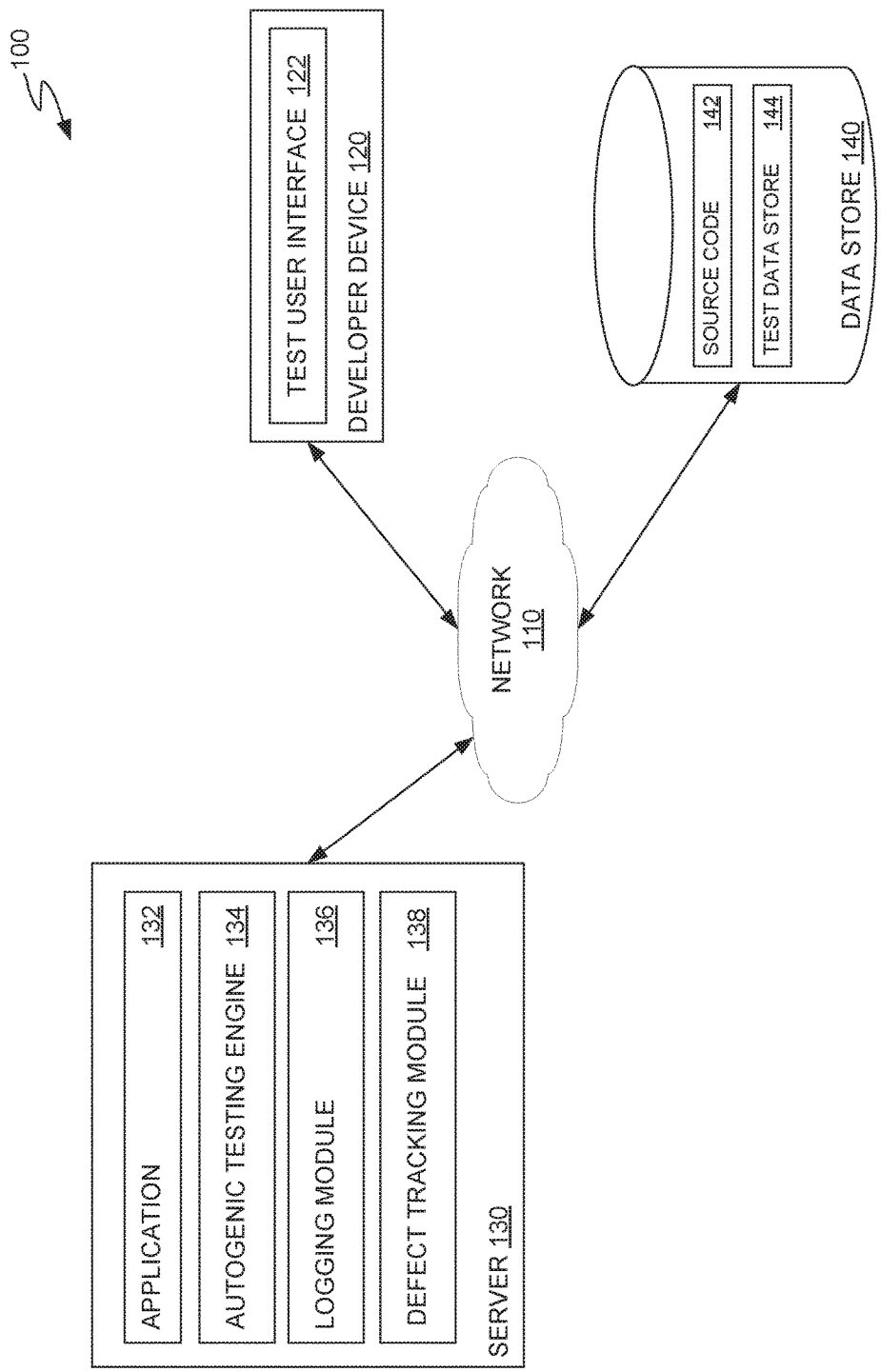
FIG. 1 illustrates an example computing environment, according to one embodiment.

FIG. 1 illustrates an example computing environment 100 for autogenic software testing, according to one embodiment of the present disclosure. As illustrated, computing environment 100 includes a developer device 120, a server 130, and a data store 140. In some embodiments, the components of these different devices may be included within a single device.

Developer device 120 may comprise a computing device such as a desktop or laptop computer, server, mobile phone, tablet computer, or the like. Developer device 120 contains test user interface 122, which may allow a user to generate and execute test requests (e.g., requests to be executed by application 132). In certain embodiments, the tests executed by a developer through test user interface 122 comprise integration tests, in which individual software modules are combined and tested as a group. In some embodiments, test user interface 122 also allows a user to view results of tests once they have been executed.

Server 130 may comprise a computing device such as a rack server, desktop or laptop computer, mobile phone, tablet computer, or the like. Server 130 comprises an application 132, which may execute requests received via an API. In certain embodiments, application 132 may comprise a web service (e.g., a remotely hosted financial services application). Server 130 further comprises an autogenic testing engine 134, which performs operations related to autogenic software testing, according to embodiments of the present disclosure. For example, autogenic testing engine 134 may scan source code (e.g., source code 142, which may be the source code of application 132) in order to identify classes to be tested. In one embodiment, autogenic testing engine 134 identifies classes to be tested by locating all classes marked "©RequestController", which is a tag added by developers to indicate that a class supports representational state transfer (REST) services, and is typically used in Spring Boot applications. Spring Boot is a java-based framework used for building web and enterprise applications. Autogenic testing engine 134 may identify the methods within these classes which are marked "@RequestMapping", which indicates that these methods may be used to generate test requests based on REST services. Autogenic testing engine 134 may then generate requests to be executed by the application 132 in order to test the identified methods. For example, autogenic testing engine 134 may use java reflections to determine the parameters defined for the API with respect to the use of these methods. In some embodiments, the parameters may comprise JavaScript Object Notation (JSON) structures which include getters and setters. JSON is an open standard file format that uses human-readable text to transmit data objects generally comprising attribute-value pairs and array data types. In certain embodiments, autogenic testing engine 134 may scan the parameters to ensure that they are primitive data types such as strings, and may disregard parameters which are not primitive data types.

Once autogenic testing engine 134 has a handle on a class to be tested, as well as the methods within the class to be used for generating requests, autogenic testing engine 134 generates a mock object for the class. Mock objects generally help software developers to build unit tests. Generally, a mock object is one created for testing purposes that can stand-in for an actual instance of the mocked object (e.g., a class) during testing. A mock object may override methods called by the function under test to return static, known values from known inputs. Typically, a developer generates mock objects to provide input into a function under test, and the output of the function under test is compared to an expected output. For example, autogenic testing engine 134 may perform a test by executing a request using the mock object on REST endpoints of application 132 (e.g., using REST-assured library, which is a tool that helps in writing automated tests for REST APIs). Autogenic testing engine 134 may compare the output of the request (e.g., a REST response) to an expected output in order to determine whether the test passed or failed. Autogenic testing engine 134 may further store the test in test data store 144 so that it can be executed regularly as changes are made to source code 142.

Server 130 further comprises logging module 136, which logs the output (e.g., requests and responses) from application 132. Requests executed by application 132 (e.g., received from test user interface 122 and autogenic testing engine 134) may contains patterns in the values of the parameters (e.g., the function parameters). For example, if the application 132 is a financial services application, a request may involve the use of a credit card number, which comprises a particular pattern of characters. In this example, the credit card number would be logged as part of the request/response from application 132 by autogenic testing engine 134.

Autogenic testing engine 134 may scan the logs produced by logging module 136 in order to identify new patterns which are not currently tested by an existing automated test. For example, if autogenic testing engine 134 identifies a pattern in a log (e.g., a credit card number which was a parameter in a function), autogenic testing engine 134 may compare the pattern to the tests in test data store 144 to determine if this pattern is currently being tested. If the pattern is already covered by one or more tests in test data store 144, it may be ignored. Otherwise, if the pattern is not covered by a test in test data store 144, autogenic testing engine 134 may use the request and response with which the pattern is associated as a test and associated expected response, storing them in test data store 144. Autogenic testing engine 134 may then continuously execute all tests stored in test data store 144 as changes are made to source code 142, comparing the results of the tests (e.g., responses from application 132) to the expected responses for the tests stored in test data store 144.

In some embodiments, autogenic testing engine 134 may further scan the logs produced by logging module 136 in order to identify exceptions which occurred during execution of requests and responses. For example, if an error occurs while application 132 is executing a test request received from test user interface 122, an exception is logged by logging module 136. Autogenic testing engine 134 may identify the exception in the log and take certain actions based on the exception. For example, autogenic testing engine 134 may generate a test based on the request which produced the exception, and store the test in test data store 144 (the expected response may be stored later once the problem has been resolved). In certain embodiments, autogenic testing engine 134 may further open an entry in a defect tracking system, such as defect tracking module 138.

Defect tracking module 138 may comprise a tool which allows software developers to store and track the progress of software defects which have been identified. For example, entries in defect tracking module 138 may identify the nature of a defect (e.g., an exception occurred during execution of a particular request), and may be either generated automatically or manually entered by developers. Autogenic testing engine 134 may create an entry in defect tracking module 138 when an exception is identified in a log produced by logging module 136, and may monitor the progress of the entry. When autogenic testing engine 134 determines that the entry in defect tracking module 138 has been closed (e.g., after a developer has fixed the problem which caused the exception described in the entry), autogenic testing engine 134 may execute the test which it created based on the exception. If application 132 executes the test request without producing any errors (e.g., no exceptions are produced), autogenic testing engine 134 may store the response from application 132 as the expected response for the test in test data store 144. In some embodiments, if the test does not complete successfully (e.g., if an exception is produced), autogenic testing engine 134 may reopen the entry in defect tracking module 138. In certain embodiments, autogenic testing engine 134 may store additional details about the defect in the reopened entry (e.g., the exception which was produced by executing the test request). These steps may allow for more effective identification and tracking of software defects, ensuring that problems are actually resolved when defect tracking entries are closed.

Data store 140 may comprise a data storage entity such as a database, repository, distributed storage system, or the like. Data store 140 includes source code 142, which may be the source code for application 132. In some embodiments source code 142 is a source code repository maintained by developers who regularly check in and out source code files and changes. As described above, autogenic testing engine 134 may scan source code 142 in order to identify classes and methods to be tested.

Data store 140 further comprises test data store 144, which may contain tests to be executed by application 132. For example, tests generated by autogenic testing engine 134 may be stored in test data store 144, and may be executed regularly as changes are made to source code 142 (resulting in a newly compiled and built application 132). The tests may determine whether a generated object matches an expected object, for example, by comparing (e.g., using one or more assertions) the value of a member of the object to an expected value of the member of the object. Autogenic testing engine 134 may generate tests that break execution of the application when a test fails or generate a notification that a particular test failed and continue execution of the application.

Figure 2:
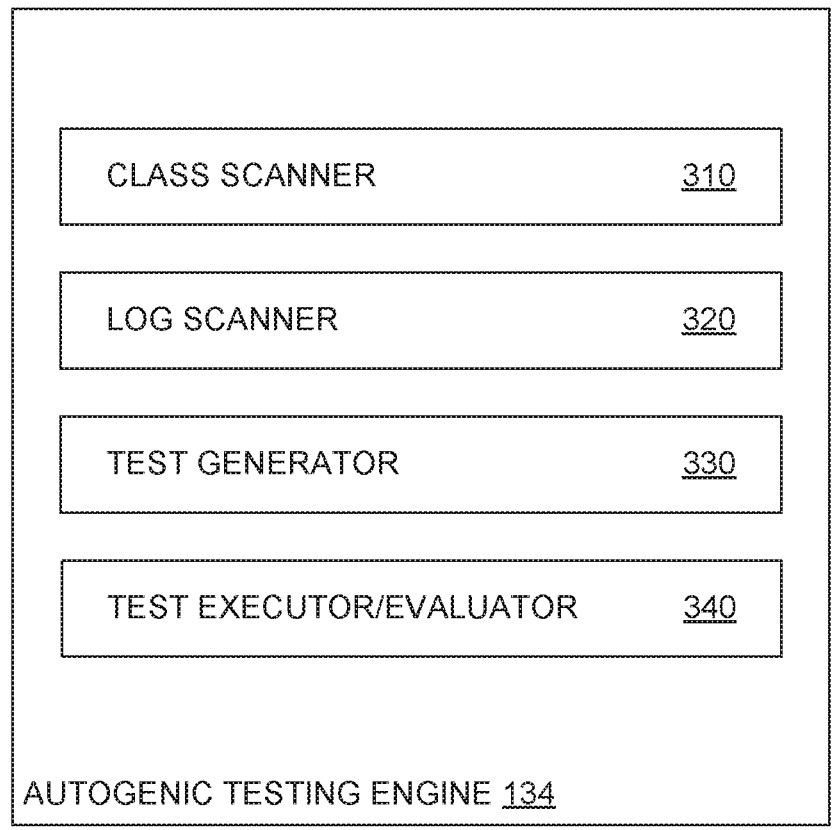
FIG. 2 illustrates components of an autogenic testing module, according to embodiments of the present disclosure.

FIG. 2 illustrates components of an autogenic testing engine 134, according to embodiments of the present disclosure.

As shown, autogenic testing engine 134 comprises a class scanner 310, a log scanner 320, a test generator 330, and a test executor/evaluator 340. Class scanner 310 may scan source code 142 in order to identify objects such as classes to be tested, as well as methods or functions within the objects or classes to be tested. This identification may be based, for example, on whether classes contain the "@RequestController" tag and whether functions contain the "@RequestMapping" tag, as described above with respect to FIG. 1. Class scanner 310 may then provide information about classes and functions to be tested to test generator 330, which may generate tests which exercise the identified classes and functions. In some embodiments, class scanner 310 or test generator 330 may check test data store 144 to determine which functions are not currently being tested by existing tests. Test generator 330 may store generated test requests in test data store 144 for future execution.

Log scanner 320 may scan logs generated by logging module 136 in order to identify untested patterns and exceptions which occurred during execution of test requests by application 132. When log scanner 320 identifies a pattern (e.g., a credit card number) in a log, log scanner 320 may check test data store 144 to determine whether this pattern is currently being tested (e.g., whether an existing test uses this pattern as an input parameter). If the pattern is untested, log scanner 320 may provide information about the pattern to test generator 330, which may generate a test using the pattern, storing the test in test data store 144. When log scanner 320 identifies an exception, log scanner 320 may check test data store 144 to determine whether there is currently a test related to this exception. If there is no test for this exception, log scanner 320 may provide information about the exception, including the request which led to the exception, to test generator 330, which may generate a test request for the exception, storing the test request in test data store 144 for future execution. Furthermore, log scanner 320 may open an entry in defect tracking module 138 for the exception.

Test generator 330 may generate tests, including requests and expected responses, which exercise methods or functions of objects such as classes in source code 142. For example, test generator 330 may generate tests based on information received from class scanner 310, generating objects using parameters of functions received from class scanner 310, and producing test requests using the objects. Additionally, test generator 330 may generate tests for new patterns (e.g., credit card number) identified by log scanner 320 by, for example, generating a test using the pattern as an input parameter for the object. Furthermore, test generator 330 may generate tests based on information received from log scanner 320 about exceptions identified in logs, producing test requests based on the requests which produced the exceptions. In some embodiments, test generator 330 may check test data store 144 to determine whether a particular request is already being tested before generating it as a new test request. When test generator 330 receives an indication from defect tracking module 138 that a defect entry has been closed (e.g., after a developer has fixed the defect), and that the test associated with the exception has completed by test executor/evaluator 340 without exception, test generator 330 may store the successful response from executing the test as the expected response for the test. Test generator 330 may store all generated tests and expected responses in test data store 144.

Test executor/evaluator 340 may perform tests by sending test requests (e.g., retrieved from test data store 144) to application 132 to be executed, and then compare the response received from application 132 to the expected response for the test stored in test data store 144. If the response matches the expected response, test executor/ evaluator 340 determines that the test has passed. If the response is different than the expected response, test executor/evaluator 340 determines that the test failed. Test executor/evaluator 340 may log results of the tests, and/or may provide results of tests to test user interface 122. If a test associated with a closed defect entry in defect tracking module 138 fails, test executor/evaluator 340 may reopen the entry, and may add additional information to the entry based on the results of the failed test. In some embodiments, test executor/evaluator 340 may execute all tests stored in test data store 144 every time a change is made to source code 142.

Figure 3:
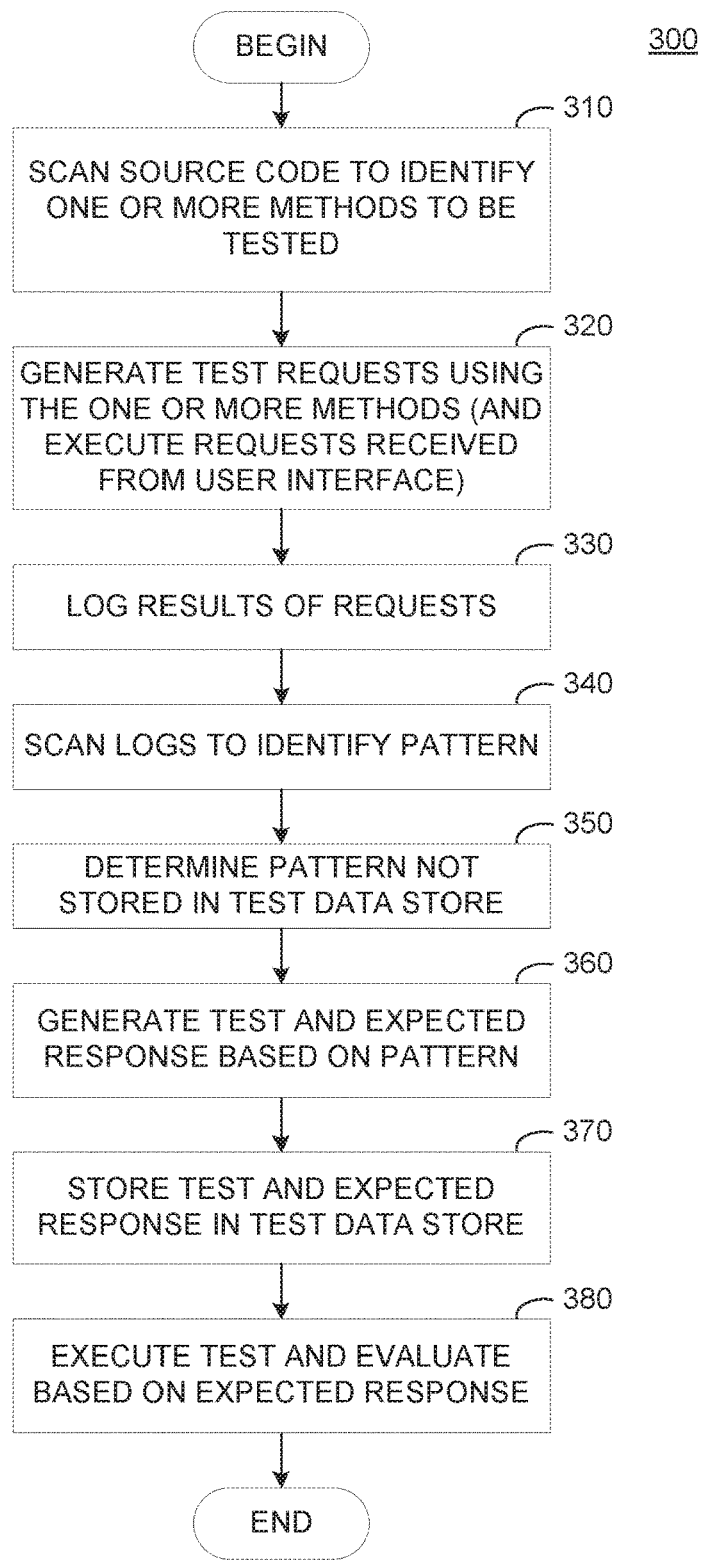
FIG. 3 illustrates example operations 300 for autogenic software testing, according to embodiments of the present disclosure.

FIG. 3 illustrates example operations 300 for autogenic software testing, according to embodiments of the present disclosure. In some embodiments, operations 300 may be performed by autogenic testing engine 134.

At 310, autogenic testing engine 134 scans source code 142 to identify one or more methods or functions of objects such as classes to be tested. For example, autogenic testing engine 134 may look for classes tagged "@RequestController" and functions tagged "@RequestMapping". Autogenic testing engine 134 may further identify parameters of the functions or methods to be tested. In some embodiments, autogenic testing engine 134 only tests functions for which all parameters are primitive data types such as string.

At 320, autogenic testing engine 134 may generate test requests using the one or more functions or methods identified at 310. For example, autogenic testing engine 134 may generate objects using the parameters of the functions identified at 310 (e.g., by random generation of strings if the parameters are of type string), and produce test requests using the objects. Autogenic testing engine 134 may store the test requests in test data store 144 and execute the test requests on application 132. Autogenic testing engine 134 may further execute requests received from test user interface 122 (e.g., provided by a developer) on application 132.

At 330, autogenic testing engine 134 logs the results of executing requests (e.g., test requests generated by autogenic testing engine 134 and received from test user interface 122). Results of executing tests may comprise responses received from application 132.

At 340, autogenic testing engine 134 scans the logs generated at 330 to identify a pattern. For example, a pattern may comprise a particular format of a credit card number (e.g., a particular number and arrangement of characters, perhaps separated by dashes).

At 350, autogenic testing engine 134 determines that the pattern is not currently being tested. For example, autogenic testing engine 134 may check test data store 144 to determine whether an existing test involved the use of this pattern as an input parameter. In this case, autogenic testing engine 134 determines that the pattern is not currently being tested. Alternatively, if the pattern is already being tested, autogenic testing engine 134 may take no further action with respect to the pattern.

At 360, autogenic testing engine 134 generated a test and expected response based on the pattern. For example, autogenic testing engine 134 may generate an object using the pattern as an input parameter and produce a test request using the object. In some embodiments, autogenic testing engine 134 may use the same request in which the pattern was identified in the log as the test request. Autogenic testing engine 134 may use the response from the log associated with the pattern as the expected response for the test.

At 370, autogenic testing engine 134 stores the test request and expected response in test data store 144 for future execution.

At 380, autogenic testing engine 134 executed the test on application 132. Autogenic testing engine 134 then compares the response from application 132 to the expected response for the test in order to determine whether the test passed or failed.

Figure 4:
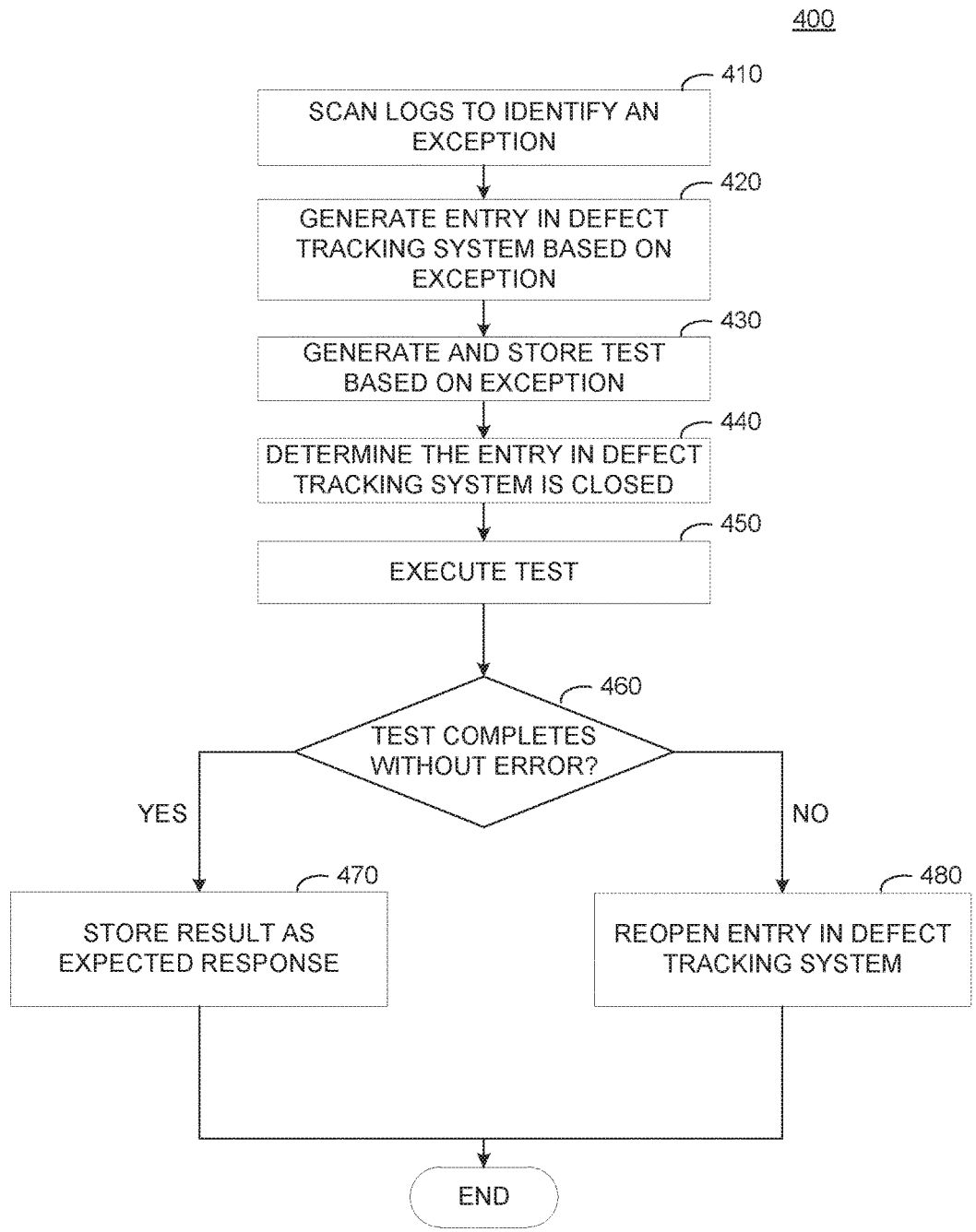
FIG. 4 illustrates additional example operations 400 for autogenic software testing, according to embodiments of the present disclosure.

FIG. 4 illustrates additional example operations 400 for autogenic software testing, according to embodiments of the present disclosure. Operations 400 may be performed by autogenic testing engine 134.

At 410, autogenic testing engine 134 scans logs to identify an exception. For example, autogenic testing engine 134 may scan logs of the results of executing requests in order to identify an exception which occurred during execution of a request.

At 420, autogenic testing engine 134 generates an entry in defect tracking module 138 based on the exception. For example, the entry may describe the exception, as well as the circumstances which led to it (e.g., the request and other contextual information gathered from the log). Developers may monitor defect tracking module 138 in order to address defects as they arise.

At 430, autogenic testing engine 134 generates and stores a test based on the exception. For example, autogenic testing engine 134 may use the request which produced the exception as a test request, and store the test request in test data store 144. An expected response will be determined after the defect has been resolved. In some embodiments, the test request is not executed until the defect entry is closed.

At 440, autogenic testing engine 134 determines that the entry in defect tracking module 138 has closed. For example, a developer may fix the defect and then close the entry, prompting defect tracking module 138 to notify autogenic testing engine 134 that the entry has been closed.

At 450 autogenic testing engine 134 executes the test request. For example, autogenic testing engine 134 may provide the test request to application 132, which may execute the request and return a response.

At 460, autogenic testing engine 134 determines whether or not the test completed without error. For example, if application 132 does not return an exception, autogenic testing engine 134 determines that the test did completed without error, and operations continue at 470. Otherwise, operations continue at 480.

At 470, having determined that the test completed without error, autogenic testing engine 134 stores the response as the expected response for the test. For example, autogenic testing engine 134 may use the response received from application 132 as the expected response to which future results of the test will be compared. Autogenic testing engine 134 may store the expected response in test data store 144.

At 480, having determined that the test produced an error, autogenic testing engine 134 reopens the entry in defect tracking module 138. For example, if application 132 returns an exception in response to executing the test request, autogenic testing engine 134 may determine that the defect has not actually been resolved, and so may reopen the entry so that a developer can address the problem. In some embodiments, autogenic testing engine 134 may store additional details about the exception, such as the request and response in which the exception was identified and other contextual information associated with the exception (e.g., the hardware and software system conditions in which the exception was produced).

Figure 5:
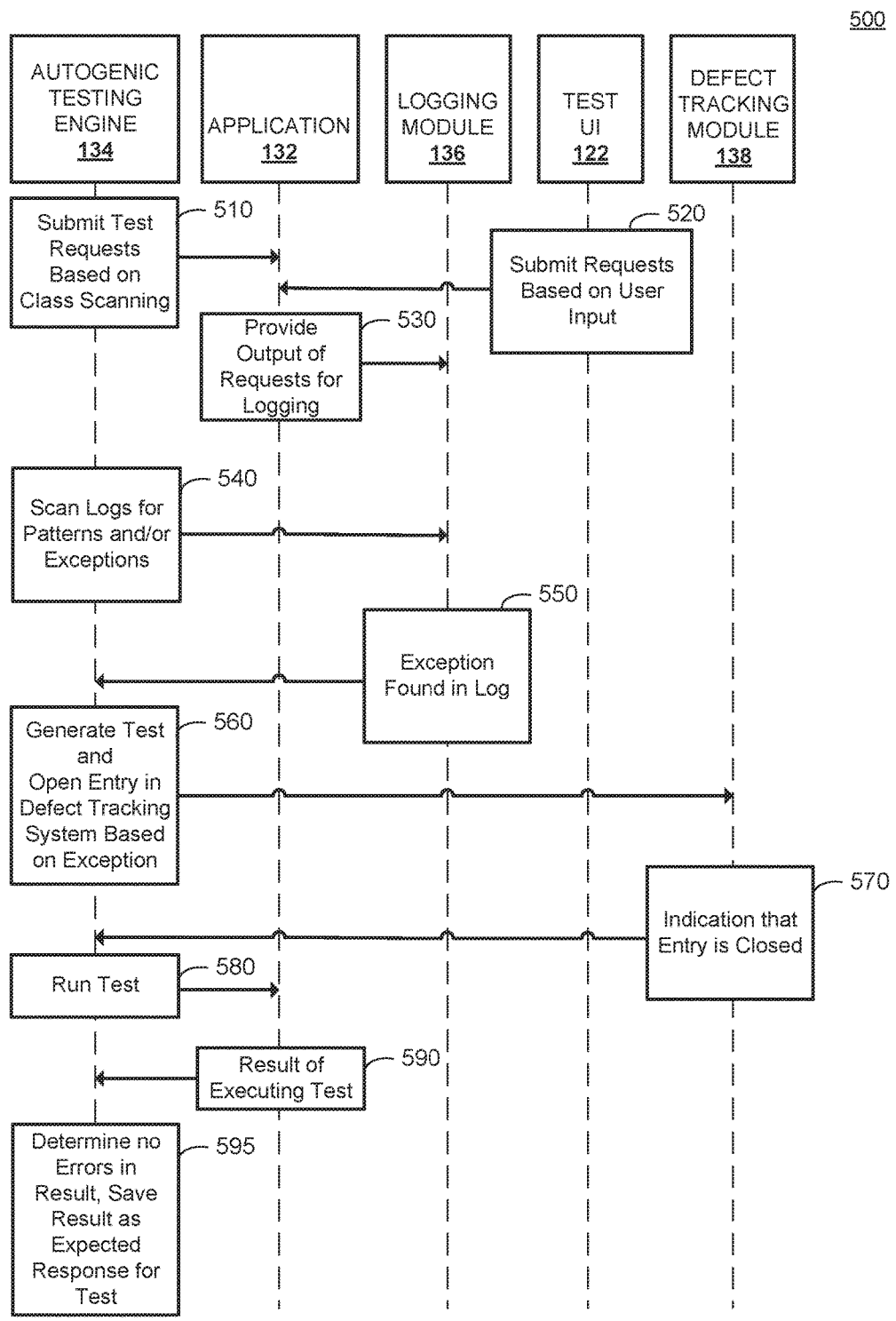
FIG. 5 illustrates a message flow 500 between components related to autogenic software testing.

FIG. 5 illustrates a message flow 500 between components related to autogenic software testing.

At 510, autogenic testing engine 134 submits test requests to application 132 based on class scanning (e.g., test requests which exercise functions of classes identified for testing during class scanning).

At 520, test user interface 122 submits test requests to application 132 (e.g., test requests defined by a developer through interactions with test user interface 122).

At 530, application 132 provides the results of the test requests to logging module 136 to be logged (e.g., the responses produced as a result of executing the test requests).

At 540, autogenic testing engine 134 scans the logs produced by logging module 136 in order to identify untested patterns and exceptions which occurred during execution of the test requests. In some embodiments, autogenic testing engine 134 checks test data store 144 in order to determine what is currently being tested.

At 550, autogenic testing engine 134 retrieved an exception which was found in a log generated by logging module 136.

At 560, autogenic testing engine 134 generates a test based on the exception (e.g., using the request which produced the exception as a test request), and generates an entry for the exception in defect tracking module 138.

At 570, defect tracking module notifies autogenic testing engine 134 that the entry has been closed (e.g., a developer has resolved the defect and closed the entry).

At 580, autogenic testing engine 134 runs the test by providing the test request associated with the exception to application 132, which executes the test request.

At 590, application 132 provides the result of executing the test to autogenic testing engine 134 (e.g., the response produced by executing the test request).

At 595, autogenic testing engine 134 determines that no error was produced by executing the test and saves the result as the expected response associated with the test request. For example, if application 132 returns a response which does not comprise an exception, autogenic testing engine 134 saves the response as the expected response for the test. Autogenic testing engine 134 may store the expected response in association with the test request in test data store 144.

Figure 6:
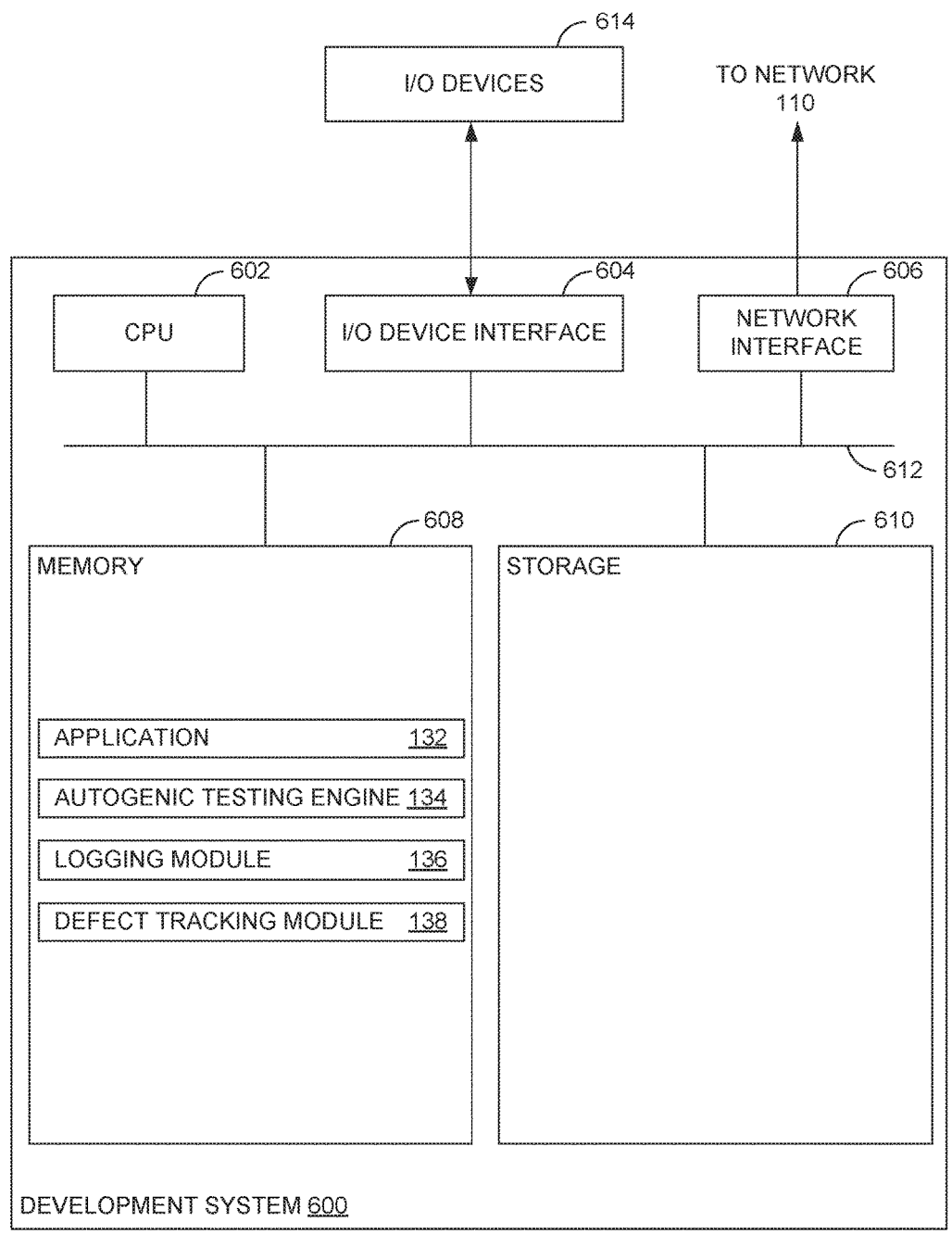
FIG. 6 illustrates an example computing system for performing autogenic software testing, according to embodiments of the present disclosure.

FIG. 6 illustrates an example development system in which autogenic software testing may be performed, according to embodiments of the present disclosure. As shown, the system 600 includes, without limitation, a central processing unit (CPU) 602, one or more I/O device interfaces 604 which may allow for the connection of various I/O devices 614 (e.g., keyboards, displays, mouse devices, pen input, etc.) to the system 600, network interface 606, a memory 608, storage 610, and an interconnect 612.

CPU 602 may retrieve and execute programming instructions stored in the memory 608. Similarly, the CPU 602 may retrieve and store application data residing in the memory 608. The interconnect 612 transmits programming instructions and application data, among the CPU 602, I/O device interface 604, network interface 606, memory 608, and storage 610. CPU 602 is included to be representative of a single CPU, multiple CPUs, a single CPU having multiple processing cores, and the like. Additionally, the memory 608 is included to be representative of a random access memory. Furthermore, the storage 610 may be a disk drive, solid state drive, or a collection of storage devices distributed across multiple storage systems. Although shown as a single unit, the storage 610 may be a combination of fixed and/or removable storage devices, such as fixed disc drives, removable memory cards or optical storage, network attached storage (NAS), or a storage area-network (SAN).

As shown, memory 608 includes an application 132, which may comprise a web service (e.g., a remotely hosted financial services application), which may execute REST requests and return REST responses. Memory 608 further includes an autogenic testing engine 134 which performs operations related to autogenic software testing which are described herein (e.g., functionality described above with respect to FIGS. 1-5). Memory 608 further includes logging module 136 which logs results of requests executed by application 132 according to embodiments of the present disclosure. Memory 608 further includes defect tracking module 138, which keeps track of software defects according to embodiments of the present disclosure. The components in memory 608 may communicate with other devices over network 110 through network interface 606.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present disclosure, other and further embodiments of the disclosure may be devised without departing from the basic scope thereof, and the scope thereof is determined by the claims that follow.

What is claimed is:

1. A method for autogenic computer software testing, comprising:
    scanning source code to identify one or more methods to be tested;
    performing requests using the one or more methods;
    generating one or more logs comprising results of the requests;
    scanning the one or more logs to identify a pattern that is associated with a request in the one or more logs and a corresponding response in the one or more logs;
    comparing the pattern to a plurality of tests in a test data store to determine whether the pattern is tested by the plurality of tests;
    upon determining that the pattern is not tested by the plurality of tests, generating a first test and a first expected response based on the request and the corresponding response that are associated in the one on r more logs with the pattern; and
    storing the first test and the first expected response in the test data store, wherein the first test is configured to be executed and evaluated based on the first expected response.

2. The method of claim 1, further comprising:
    scanning the one or more logs to identify an exception;
    generating an entry in a defect tracking system based on the exception; and
    storing a second test in the test data store based on the exception.

3. The method of claim 2, further comprising:
    determining that the entry in the defect tracking system has been closed;
    executing the second test;
    determining that no errors are generated as a result of executing the second test; and
    storing a result of executing the second test as a second expected response associated with the second test in the test data store.

4. The method of claim 2, further comprising:
    determining that the entry in the defect tracking system has been closed;
    executing the second test;
    determining that an error is generated as a result of executing the second test; and
    reopening the entry in the defect tracking system.

5. The method of claim 1, further comprising:
    performing one or more requests based on user input;
    generating one or more additional logs comprising results of the one or more requests;
    scanning the one or more additional logs to identify a pattern associated with a request;
    determining that the pattern is not stored in a test data store;
    generating a second test and a second expected response based on the pattern; and
    storing the second test and the second expected response in the test data store, wherein the second test is executed and evaluated based on the second expected response.

6. The method of claim 5, wherein the user input is received from a test user interface.

7. The method of claim 1, wherein the pattern comprises a number and a type of characters in a card identifier.

8. A non-transitory computer-readable medium comprising instructions, which, when executed by a processor, perform a method for method for autogenic computer software testing, comprising:
    scanning source code to identify one or more methods to be tested;
    performing requests using the one or more methods;
    generating one or more logs comprising results of the requests;
    scanning the one or more logs to identify a pattern that is associated with a request in the one or more logs and a corresponding response in the one or more logs;
    comparing the pattern to a plurality of tests in a test data store to determine whether the pattern is tested by the plurality of tests;
    upon determining that the pattern is not tested by plurality of tests, generating a first test and a first expected response based on the request and the corresponding response that are associated in the one or more logs with the pattern; and
    storing the first test and the first expected response in the test data store, wherein the first test is configured to be executed and evaluated based on the first expected response.

9. The non-transitory computer-readable medium of claim 8, wherein the method further comprises:
    scanning the one or more logs to identify an exception;
    generating an entry in a defect tracking system based on the exception; and storing a second test in the test data store based on the exception.

10. The non-transitory computer-readable medium of claim 9,
wherein the method further comprises:
determining that the entry in the defect tracking system has been closed;
executing the second test;
determining that no errors are generated as a result of executing the second test; and
storing a result of executing the second test as a second expected response associated with the second test in the test data store.

11. The non-transitory computer-readable medium of claim 9, wherein the method further comprises:
determining that the entry in the defect tracking system has been closed;
executing the second test;
determining that an error is generated as a result of executing the second test; and
reopening the entry in the defect tracking system.

12. The non-transitory computer-readable medium of claim 8, wherein the method further comprises:
performing one or more requests based on user input;
generating one or more additional logs comprising results of the one or more requests;
scanning the one or more additional logs to identify a pattern associated with a request;
determining that the pattern is not stored in a test data store;
generating a second test and a second expected response based on the pattern; and
storing the second test and the second expected response in the test data store, wherein the second test is executed and evaluated based on the second expected response.

13. The non-transitory computer-readable medium of claim 8, wherein the user input is received from a test user interface.

14. The non-transitory computer-readable medium of claim 8, wherein the pattern comprises a number and a type of characters in a card identifier.

15. A system, comprising:
a processor; and
a memory storing instructions, which, when executed by the processor, cause the system to perform a method for autogenic computer software testing, comprising:
scanning source code to identify one or more methods to be tested;
performing requests using the one or more methods;
generating one or more logs comprising results of the requests;
scanning the one or more logs to identify a pattern that is associated with a request in the one or more logs and a corresponding response in the one or more logs;
comparing the pattern to a plurality of tests in a test data store to determine whether the pattern is tested by the plurality of tests;
upon determining that the pattern is not tested by the plurality of tests, generating a first test and a first expected response based on the request and the corresponding response that are associated in the one or more logs with the pattern; and
storing the first test and the first expected response in the test data store, wherein the first test is configured to be executed and evaluated based on the first expected response.

16. The system of claim 15, wherein the method further comprises:
scanning the one or more logs to identify an exception;
generating an entry in a defect tracking system based on the exception; and
storing a second test in the test data store based on the exception.

17. The system of claim 16, wherein the method further comprises:
determining that the entry in the defect tracking system has been closed;
executing the second test;
determining that no errors are generated as a result of executing the second test; and
storing a result of executing the second test as a second expected response associated with the second test in the test data store.

18. The system of claim 16, wherein the method further comprises:
determining that the entry in the defect tracking system has been closed;
executing the second test;
determining that an error is generated as a result of executing the second test; and
reopening the entry in the defect tracking system.

19. The system of claim 15, wherein the method further comprises:
performing one or more requests based on user input;
generating one or more additional logs comprising results of the one or more requests;
scanning the one or more additional logs to identify a pattern associated with a request;
determining that the pattern is not stored in a test data store;
generating a second test and a second expected response based on the pattern; and
storing the second test and the second expected response in the test data store, wherein the second test is executed and evaluated based on the second expected response.

20. The system of claim 15, wherein the user input is received from a test user interface.

21. The system of claim 15, wherein the pattern comprises a number and a type of characters in a card identifier.

* * * * *

UNITED STATES PATENT AND TRADEMARK OFFICE
CERTIFICATE OF CORRECTION

PATENT NO.       : 10,176,087 B1
APPLICATION NO.  : 15/693031
DATED            : January 8, 2019
INVENTOR(S)      : Thomas et al.

Page 1 of 1

It is certified that error appears in the above-identified patent and that said Letters Patent is hereby corrected as shown below:

On the Title Page

Item (72), Inventor #2 should be changed to "Amit Kshirsagar"

Signed and Sealed this
Twelfth Day of November, 2019

Andrei Iancu
*Director of the United States Patent and Trademark Office*